United States Patent [19]
Braun et al.

[11] 4,140,935
[45] Feb. 20, 1979

[54] D-C DYNAMO ELECTRIC MACHINE

[75] Inventors: Herbert Braun, Ditzingen; Paul Rauschenberger, Aichwald; Anton Tosch, Schwieberdingen, all of Fed. Rep. of Germany

[73] Assignee: Robert Bosch GmbH, Stuttgart, Fed. Rep. of Germany

[21] Appl. No.: 759,132

[22] Filed: Jan. 13, 1977

[30] Foreign Application Priority Data

Feb. 13, 1976 [DE] Fed. Rep. of Germany ....... 2605894

[51] Int. Cl.$^2$ ............................................. H02K 23/24
[52] U.S. Cl. ................................... 310/224; 310/186; 310/218
[58] Field of Search ........................... 310/220–226, 310/46, 179, 182, 183, 186–188, 192, 193, 177, 218, 254, 258, 269, 42; 29/732; 322/64–66; 318/521–524

[56] References Cited

U.S. PATENT DOCUMENTS

| | | | |
|---|---|---|---|
| 975,425 | 11/1910 | Hensley | 310/220 |
| 1,764,890 | 6/1930 | Reichel | 310/258 |
| 2,726,345 | 12/1955 | Guilbert | 310/224 |
| 3,263,147 | 7/1966 | Robinett | 310/188 |
| 3,590,293 | 6/1971 | Susdorf | 310/182 |
| 3,809,937 | 5/1974 | Sjoberg | 310/254 |

*Primary Examiner*—R. Skudy
*Attorney, Agent, or Firm*—Flynn & Frishauf

[57] ABSTRACT

To improve commutation and, particularly, to suppress commutator sparking and arc-over or flash-over, an auxiliary yoke is placed between the main poles and the auxiliary or commutating poles of a salient pole machine, the auxiliary yoke being formed of stacked lamellae, preferably with an adjustable air gap. Adjustability can be obtained by forming the auxiliary yoke with two interengaging sections, one of which is movable with respect to the other, so that commutation at the specific poles can be adjusted by adjusting the air gap of the auxiliary yoke.

8 Claims, 3 Drawing Figures

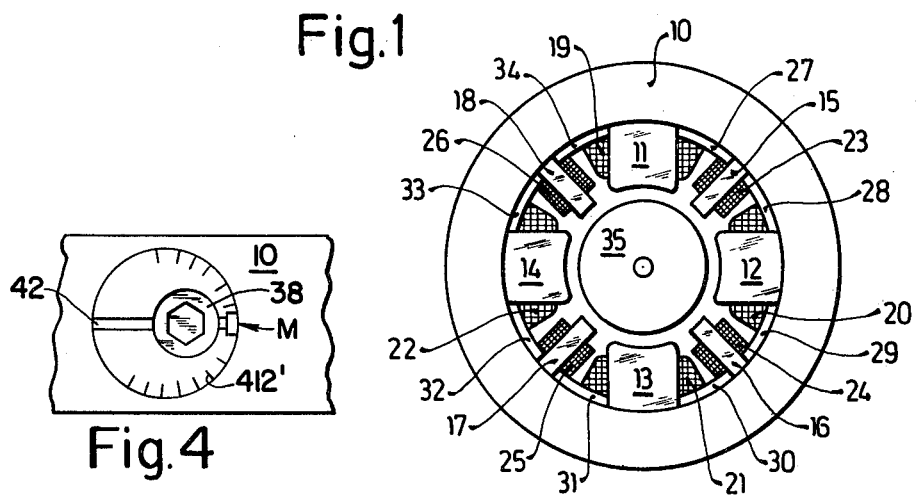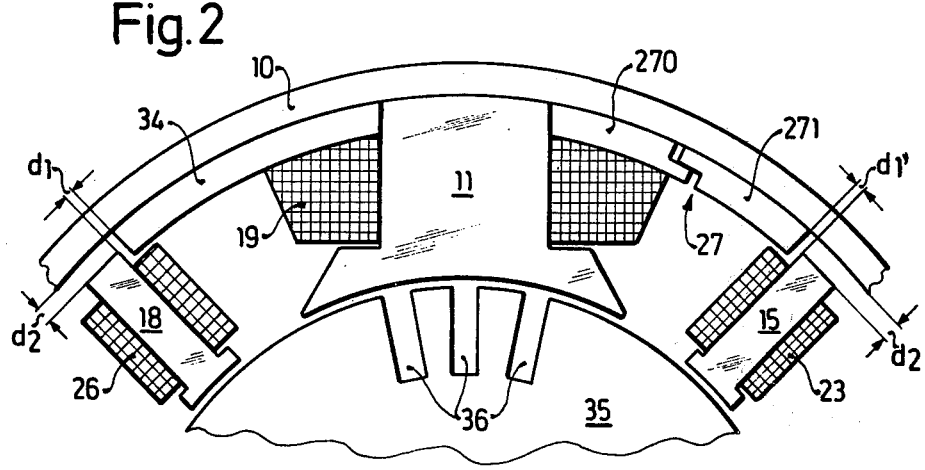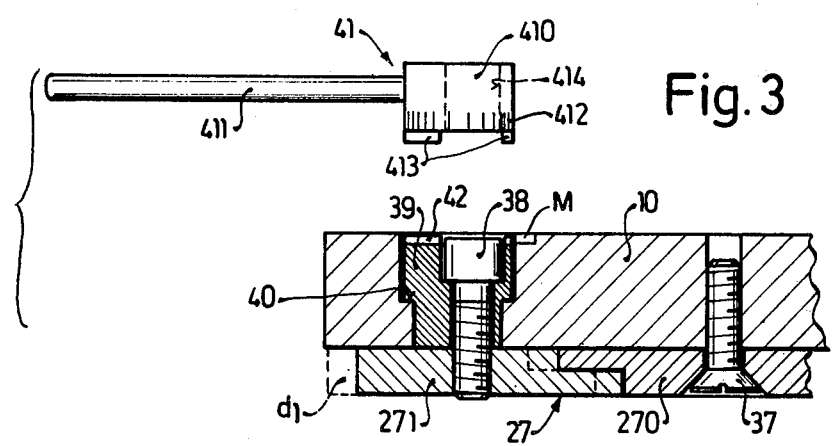

D-C DYNAMO ELECTRIC MACHINE

The present invention related to dynamo electric machines, and more particularly to d-c dynamo electric machines with salient poles, main poles and additional auxiliary or commutating poles.

Larger dynamo electric machines usually use auxiliary cummutating poles, secured to the yoke of the field magnet. The commutating poles are located between the main poles and their purpose is to compensate the reactance voltage induced due to the armature slot stray flux, and thus to reduce commutator brush sparking. Usually, the number of commutating poles is equal to that of the main poles; in lower power machines, however, it has been proposed to use only half as many commutating poles as main poles.

If flux and current conditions change rapidly, for example upon transition from motor operation to generator operation, or vice versa, or upon rapid changes in loading, the commutating voltage is retarded with respect to the reactance voltage. This is particularly the case in d-c machines having commutating poles and a solid yoke structure. D-C dynamo electric machines, even with commutating poles, tend to be subjected to substantial brush sparking and, under extreme conditions, even to commutator flash-over. The commutator pole flux which in part controls the commutator voltage is reduced by eddy currents in the massive yoke and is time-delayed with respect to the stray flux due to the slots in the machine. These disadvantages would be reduced if the yoke could be made of stacked lamellae; in large machines, however, structural difficulties arise which can hardly be overcome if the yokes are made of stacked separate sheets or laminations.

It is an object of the present invention to decrease and preferably completely eliminate brush sparking in d-c dynamo electric machines having main poles and auxiliary poles, without requiring the use of a yoke made of a stacked, laminated construction.

SUBJECT MATTER OF THE PRESENT INVENTION

Briefly, auxiliary yokes are provided, located between the main poles and auxiliary poles of the machine, the auxiliary poles being made as a laminar structure.

Air gaps of adjustable width are provided between the auxiliary poles and the yoke in order to reduce the labor in the adjustment of the air gaps, adjustable air gap is provided between a main pole and an auxiliary pole in the auxiliary yoke; is constructed by forming at least a portion of the auxiliary yoke as overlapping lamellae, one zone of which is adjustable with respect to the other. In accordance with the feature of the invention, one portion of the lamination of the auxiliary yoke is fixed to the solid yoke structure, the other portion being adjustably secured, for example by means of an eccenter, which can be accurately positioned, so that the air gap can be accurately adjusted.

The value of the commutating field voltage depends to a large extent on the length of the air gap between the commutating poles and the yokes; the inclination of the commutating pole characteristics also depends on the air gap. The adjustment of the air gap is one of the important features upon testing of a dynamo electric machine, since these air gaps must have an optimum dimension. Optimizing the air gaps is very time-consuming, since it is usually necessary to adjust the air gap, assemble the machine, test the machine and, if it does not test our satisfactorily, disassemble the machine, readjust the air gap, and re-assemble and repeat the steps. It would, therefore, be of substantial advantage to be able to adjust the air gaps of the auxiliary poles with respect to the yoke without requiring the laborious disassembly and re-assembly. By placing the air gap between auxiliary yoke portions it is possible to adjust the air gap between the auxiliary poles and the solid yoke with respect to a fixed minimum design value and then effect fine adjustment by changing the air gap between the auxiliary yoke and the poles.

The advantages of the present invention essentially are reduction or total elimination of brush sparking even if rapid changes in current or flux occur, of if the machine changes suddenly from motor to generator operation, or vice versa. The delay of the commutating pole flux and hence commutating voltage with respect to the stray flux due to the slots, that is, the quadrature voltage, particularly upon rapid changes in current, is reduced. This so improves commutation that, particularly in limiting situations of very rapid change, commutator flashover or arc-over is entirely avoided, without requiring the expensive and complicated solution of making the yoke structure itself as a stacked laminar structure. Optimizing operation of the dynamo electric machine is simplified and improved, particularly since the air gap between the commutating poles and the yoke can be accurately adjusted without requiring disassembly and re-assembly of the machine. Adjustment, in accordance with a feature of the invention, can be carried out from the outside of the machine. This also permits individual adjustment of the commutating pole characteristics matched to the particular brush assemblies, thus compensating for manufacturing tolerances and dissymmetries of the machine. The invention will be described by way of example with reference to the accompanying drawings, wherein:

FIG. 1 is a schematic cross-sectional representation of a four-pole d-c dynamo electric machine, having a four-pole field magnet, commutating poles and auxiliary yokes;

FIG. 2 is a fragmentary end view, to a greatly enlarged scale, showing two commutating field poles, a main field pole and an auxiliary yoke structure;

FIG. 3 is an exploded view, to a still greater enlarged scale, of a portion of the auxiliary yoke structure of FIG. 3 illustrating further an adjustment key or tool;

FIG. 4 is a schematic top view showing an adjustment scale arrangement.

The dynamo eletric machine shown schematically in FIG. 1 has a yoke 10 and four main poles 11 to 14; symmetrically located between the main poles are four commutating poles 15 and 18. The main poles 11 and 14 are wound with main pole windings 19 to 22; the commutating poles 15 to 18 have commutating pole windings 23 to 26. The main and auxiliary poles are secured to the yoke structure 10 which is solid.

In accordance with the present invention, auxiliary yokes 27, 28, 29, 30, 31, 32, 33, 34 are located between the main field poles and the auxiliary poles. Although the yoke 10 is solid, the auxiliary yokes 27 to 34 are formed to stacked lamallae or stacked sheets. The main poles, as well as the commutating poles, are also formed as laminar structures. An armature 35 is supported centrally within the pole structure.

The main pole 11 and two commutating poles 15 and 18 are shown in greater detail and to a larger scale in FIG. 2. One of the auxiliary yokes, yoke 34, is a single element, secured to the solid yoke 10, constructed of a series of stacked laminations. An air gap $d_1$ is located between the auxiliary yoke 34 and the commutating pole 18. Commutating pole 18 is secured to the yoke structure 10 with interposition of an air gap $d_2$. The auxiliary yoke 27 is formed as a two-part structure, having parts 270, 271, with interengaging, interlocking lamellae. The two parts 270, 271 are overlapping at their junction, and can be moved relative to each other. The overlap between the laminar portions 270, 271 should be so arranged that movement of one portion with respect to the other does not cause an air gap to arise. The auxiliary yoke portion 270 is fixedly secured to the yoke structure 10 and to the main pole structure 11. The second auxiliary yoke portion or element 271 can be moved along the solid main yoke 10, so that the air gap $d_1'$, with respect to the commutating pole 15, can be changed. Only three slots 36 in the armature 35 are shown, to simplify the drawings.

The air gap $d_1$, or $d_1'$, could be located at any convenient position between the main pole 11 and an auxiliary pole, the structure, as shown, is preferred.

Adjustment of the yoke portions 270, 271 with respect to each other is illustrated in still larger scale in FIGS. 3 and 4, in which a portion of the yoke 10 with the auxiliary yoke portion elements 270, 271, and forming the auxiliary yoke 27, are shown. The auxiliary yoke element portion 270 is fixedly secured to the yoke 10 by means of screw 37. The movable auxiliary yoke portion 271 is attached to the yoke 10 by an externally accessible bolt 38 which passes through an eccenter bushing 39. The eccenter bushing 39 is inserted into a two-step or diameter bore in the yoke 10. Upon tightening of bolt 38, the eccenter bushing 39 will be pressed against the offset or shoulder 40 of the bore and pull the yoke portion 271 against yoke 10, thus securely fixing the auxiliary yoke 271 in position.

Adjustment operation: Bolt 38 is loosened. Thereupon, eccenter 39 can be rotated, thus permitting adjustment by sliding the auxiliary yoke portion 271 with respect to the yoke, and thereby changing the length of the air gap $d_1'$. After adjustment of the air gap, bolt 38 is tightened.

FIG. 3 illustrates a particularly suitable key or tool to effect the adjustment. Key 41 has a cylindrical portion 410 and an adjustment lever 411 secured thereto. To effect precise, reproducible positioning, or adjustment or positioning scale 412 is provided on the tool. The eccenter 39 has recesses 42 formed therein in which screwdriver-type projections or pins projections 413 can engage. An asymmetrical bore 414 is formed in the eccenter to permit tightening of bolt 38 while holding the eccenter 39 in precise adjustment by means of the key 41.

The adjustment scale may, of course, also be applied directly to the eccenter 39 (FIG. 4) for example like scale 412' applied to the end face thereof, to cooperate with a suitable bench mark M formed on the outside of the yoke 10.

Various changes and modifications may be made within the scope of the inventive concept.

We claim:

1. D-C dynamo electric machine having a field magnet structure comprising
   a main yoke structure (10);
   main poles (11-14) secured to the yoke structure;
   auxiliary poles (15-18) secured to the yoke structure;
   auxiliary yoke elements (27-34) comprising a stack of auxiliary yoke laminations secured to the main yoke structure (10) and extending between the main poles (11-14) and the auxiliary poles (15-18); and
   an air gap ($d_1$) of adjustable width in the auxiliary yoke elements between an auxiliary pole (15-18) and an adjacent main pole (11-14).

2. Machine according to claim 1, wherein the yoke structure is an essentially cylindrical structure and the lamellae of the auxiliary yoke elements are located at the inside of the cylindrical yoke structure.

3. Machine according to claim 1, wherein the auxiliary yoke elements comprise mutually adjustable yoke element portions including overlapping lamellae.

4. Machine according to claim 3, wherein one yoke portion (270) of an auxiliary yoke is fixedly secured to the main yoke structure (10) and the other yoke portion (271) is slidable with respect to the main yoke structure (10).

5. Machine according to claim 4, further comprising means (38, 39) adjustably securing the slidable auxiliary yoke portion (271) with respect to the main yoke stucture (10).

6. Machine according to claim 5, wherein the adjustable securing means comprises an eccenter (39) and clamp means (38) clamping the eccenter in position.

7. Machine according to claim 6, further comprising an adjustment positioning indicating means to set the eccentricity of the eccenter and provide an indication thereof.

8. Machine according to claim 6, wherein said eccenter is formed with an accessible bore therethrough, and the clamp means comprises a bolt (38) passing through said bore.

* * * * *